US007247190B2

(12) United States Patent
Miura

(10) Patent No.: US 7,247,190 B2
(45) Date of Patent: Jul. 24, 2007

(54) ENGINE EXHAUST GAS CLEANING APPARATUS

(75) Inventor: Manabu Miura, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 434 days.

(21) Appl. No.: 10/883,656

(22) Filed: Jul. 6, 2004

(65) Prior Publication Data

US 2005/0022516 A1 Feb. 3, 2005

(30) Foreign Application Priority Data

Jul. 31, 2003 (JP) ............................. 2003-283285

(51) Int. Cl.
*B01D 46/00* (2006.01)
*F01N 3/23* (2006.01)

(52) U.S. Cl. ................... 95/278; 95/8; 95/283; 95/285; 55/282.2; 55/282.3; 55/283; 55/385.3; 55/523; 55/524; 55/DIG. 10; 55/DIG. 30; 60/274; 60/285; 60/295; 60/299; 60/303; 60/311

(58) Field of Classification Search ............... 55/282.2, 55/282.3, 385.3, 283, 523, 524, DIG. 10, 55/DIG. 30; 95/278, 283, 285, 8; 60/274, 60/282, 285, 295, 297, 299, 301, 303, 311
See application file for complete search history.

(56) References Cited

U.S. PATENT DOCUMENTS 5,050,376 A * 9/1991 Stiglic et al. ................. 60/274
5,732,554 A * 3/1998 Sasaki et al. ................. 60/311
6,092,016 A 7/2000 Sarangapani et al.
6,957,642 B2 * 10/2005 Miura ......................... 60/285
6,990,801 B2 * 1/2006 Kitahara ...................... 60/311
7,104,051 B2 * 9/2006 Shimasaki et al. ............ 60/297
2002/0029562 A1 * 3/2002 Ishii et al. .................... 60/295
2003/0041590 A1 3/2003 Kitajima et al.
2003/0110760 A1 * 6/2003 Shirakawa ................... 60/301
2005/0144934 A1 * 7/2005 Nakatsuji et al. ............. 60/295
2005/0217240 A1 * 10/2005 Naik ........................... 60/274

FOREIGN PATENT DOCUMENTS

EP 1 072 763 A1 * 1/2001
JP 8-218920 A 8/1996
JP 2000-213396 * 8/2000

* cited by examiner

*Primary Examiner*—Jason M. Greene
(74) *Attorney, Agent, or Firm*—Global IP Counselors

(57) ABSTRACT

An engine exhaust gas cleaning apparatus is provided to minimize torque shock as during regeneration of an exhaust gas cleaning device. The engine exhaust gas cleaning apparatus comprises a fuel delivery device that delivers fuel to an engine at a lean excess air ratio during normal operation of the engine; a NOx trapping catalytic converter that adsorbs NOx from the exhaust gas during the lean operation; a regeneration control section that adjusts the excess air ratio to a rich target value to regenerate the NOx trapping catalytic converter; a feedback control section that feedback-controls the fuel delivery quantity to hold the excess air ratio at the target value during regeneration; a feedback control restricting section that restricts the feedback control during regeneration until the difference between the target value and the actual excess air ratio is less than a prescribed value.

18 Claims, 7 Drawing Sheets

ENGINE EXHAUST GAS CLEANING APPARATUS

BACKGROUND OF THE INVENTION

1. Field of the Invention

The present invention generally relates to exhaust gas cleaning apparatuses for internal combustion engines. More specifically, the present invention relates to an exhaust gas cleaning apparatus that regenerates an exhaust gas cleaning device by changing the excess air ratio.

2. Background Information

In internal combustion engines such as diesel engines, an exhaust gas recirculating system (EGR system) is widely used wherein a part of the exhaust gas is recirculated to lower the combustion temperature in order to reduce discharge of nitrogen oxide (NOx). A NOx trapping catalytic converter traps NOx in the exhaust gas when an air-fuel ratio in the exhaust gas is in a lean range and purifies (releases) the trapped NOx when the air-fuel ratio is in a rich range. The NOx deposited in the NOx trapping catalytic converter is typically purified when the amount of adsorbed and held NOx reaches a prescribed upper limit value.

One example of an internal combustion engine having a NOx trapping catalytic converter provided in an exhaust system for cleaning NOx discharged from the engine is disclosed in U.S. Pat. No. 5,732,554 (also see, Japanese Laid-Open Patent Publication No. 08-218920). The NOx trapping catalytic converter described in that document is configured to adsorb and hold NOx contained in the exhaust gas when the excess air ratio is lean, and to desorb and deoxidize the adsorbed NOx when the excess air ratio is rich. These types of NOx trapping catalytic converters are generally applied to internal combustion engines that are normally operated at a lean excess air ratio. When the amount of adsorbed and held NOx reaches a prescribed upper limit value, the NOx trapping catalytic converter can no longer adsorb and hold more NOx. Consequently, the amount of held NOx is estimated and the NOx trapping catalytic converter is regenerated.

When the NOx trapping catalytic converter is regenerated, an intake air throttle valve or the like is used to reduce the amount of intake air into the engine to reduce the excess air ratio to a richer target value. Simultaneously, the fuel injection amount is increased such that the excess air ratio converges on the richer target value.

In view of the above, it will be apparent to those skilled in the art from this disclosure that there exists a need for an improved internal combustion engine exhaust gas cleaning apparatus. This invention addresses this need in the art as well as other needs, which will become apparent to those skilled in the art from this disclosure.

SUMMARY OF THE INVENTION

It has been discovered that when feedback control of the fuel injection quantity is started immediately after the engine shifts to regeneration control of the NOx trapping catalytic converter, then the excess air ratio will not reach the richer target value right away even if and the intake air throttle valve is constricted. Furthermore, if the fuel injection quantity is increased under these conditions, it is possible that the severe fluctuations in output will cause torque shock to occur.

The present invention was conceived to substantially avoid this kind of problem. Thus, one proposed object of the present invention is to provide an internal combustion engine exhaust gas cleaning apparatus that substantially prevents the occurrence of torque shock during regeneration of the exhaust gas cleaning device to the greatest extent possible.

In view of the forgoing, an engine exhaust gas cleaning apparatus is provided for an engine that basically comprises a fuel delivery device, an exhaust gas cleaning device, and a control unit configured to control the fuel delivery device. The fuel delivery device is configured to deliver a fuel delivery quantity of fuel to the engine to produce an excess air ratio that is lean during normal operation of the engine. The exhaust gas cleaning device is arranged in an exhaust system and configured to clean exhaust gas during a lean operation. The control unit includes a regeneration timing determining section, a regeneration control section and a feedback control section. The regeneration timing determining section is configured to determine a regeneration operation timing to regenerate the exhaust gas cleaning device. The regeneration control section is configured to adjust the excess air ratio toward a rich target value to regenerate the exhaust gas cleaning device. The feedback control section is configured to feedback-control the fuel delivery quantity such that the excess air ratio is maintained at the rich target value during regeneration. The feedback control restricting section is configured to restrict the feedback control during regeneration until a difference between the rich target value and an actual excess air ratio is less than a prescribed value.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
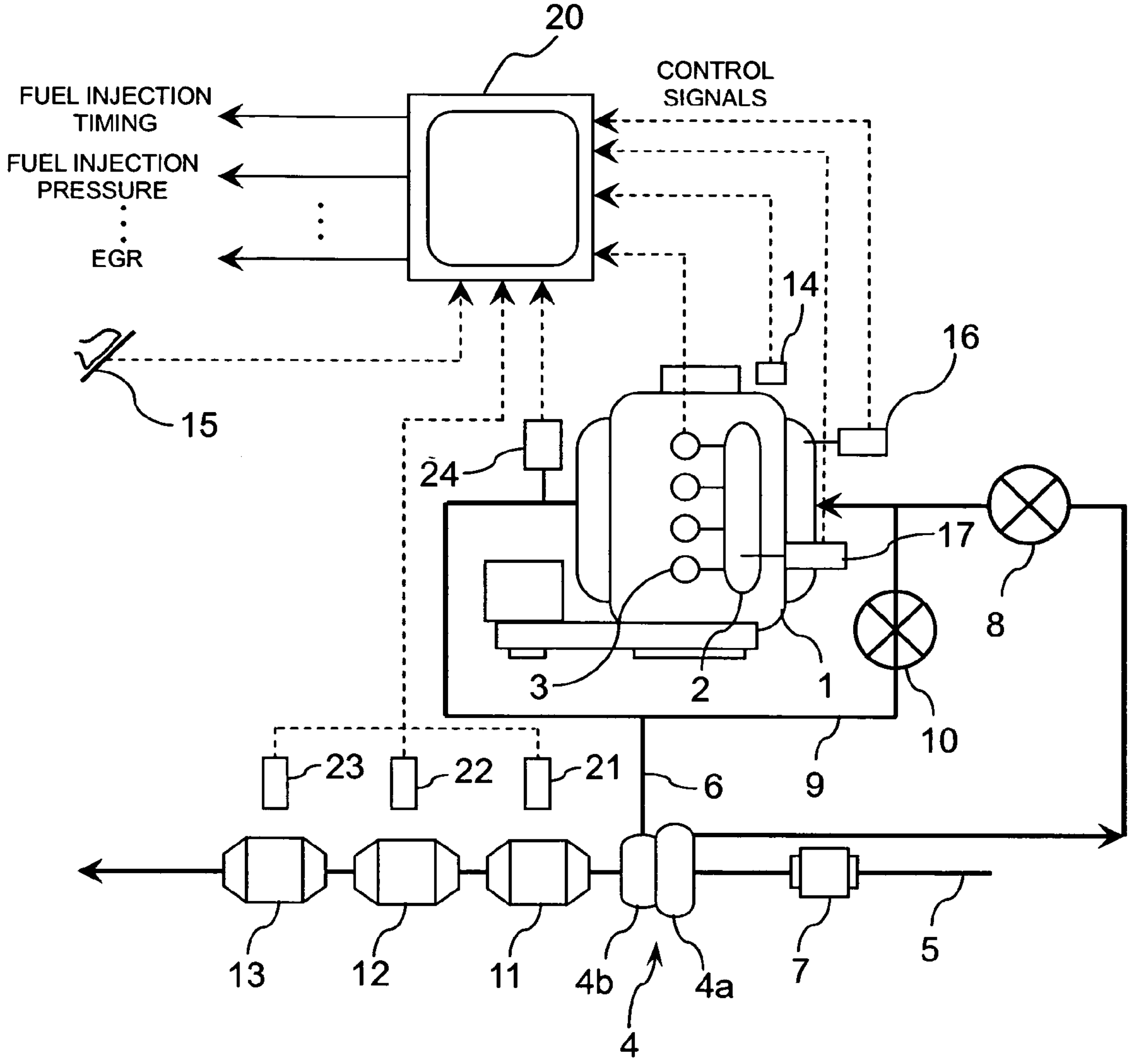
FIG. 1 is a diagrammatic view of an exhaust gas cleaning apparatus or system for an internal combustion engine, e.g., a diesel engine, in accordance with one embodiment of the present invention.

Referring initially to FIG. 1, an exhaust gas cleaning apparatus is illustrated for an internal combustion engine such as a supercharged diesel engine 1 in accordance with one embodiment of the present invention. An exhaust gas cleaning apparatus in accordance with the present invention can be applied to internal combustion engines used in automobiles and the like.

In the present invention, the fuel injection quantity is feedback controlled when lowering the excess air ratio λ to the rich target value during regeneration of the exhaust gas cleaning device. As a result, the excess air ratio λ can be controlled precisely to the rich value required for regeneration of the exhaust gas cleaning device. Additionally, when the apparatus shifts to the regeneration operation, the feedback control of the fuel injection quantity does not start until the difference between the target value λt and the actual excess air ratio λr is smaller than a prescribed value e, which is experimentally attained. As a result, it is possible to reliably prevent the occurrence of torque shock caused by a sudden increase in fuel injection quantity when the engine shifts to feedback control.

Figure 2:
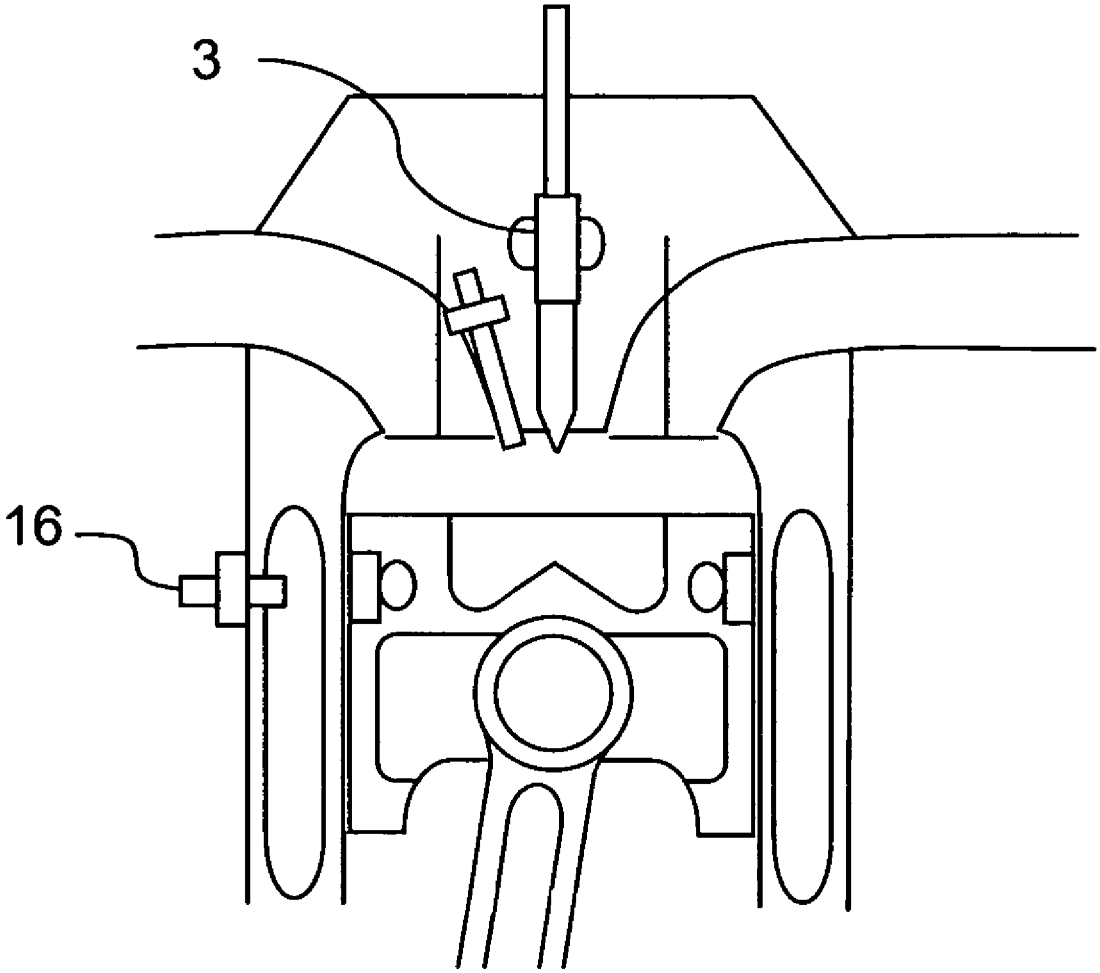
FIG. 2 is a diagrammatic cross sectional view of one of the combustion chambers of the internal combustion engine illustrated in FIG. 1 in accordance with one embodiment of the present invention.

As shown in to FIGS. 1 and 2, the engine 1 includes a common rail fuel injection system including a common rail 2, a plurality of fuel injection valets 3, and a high-pressure fuel pump (not shown) so as to be supplied with pressurized fuel. The fuel pump (not shown) pumps fuel to the common rail 2, where the pressurized fuel accumulates, and high-pressure fuel is delivered to the inside of the combustion chambers when the fuel injection valets 3 are opened. Thus, the fuel injection valets 3 inject fuel directly into respective combustion chambers (not shown) of each cylinder.

The fuel injection valets 3 are configured and arranged to execute a pilot injection before the main injection or executing a post-injection following the main injection. By changing the accumulation pressure of the common rail 2, the fuel injection pressure can be controlled in a variable manner.

A turbocharger (supercharger) 4 having a compressor 4*a* is arranged in an air intake passage 5 of the air intake system. The compressor 4*a* serves to pressurize the intake air. The compressor 4*a* is rotated by a turbine 4*b* that is driven by exhaust gas flowing through an exhaust passage 6. The supercharger 4 is positioned downstream of an air flow meter 7 in the air intake passage 5 of the engine 1. Preferably, the supercharger 4 is a variable-capacity type supercharger having a variable nozzle provided on the turbine 4*b*. By using a variable-capacity type supercharger 4, the variable nozzle can be constricted when the engine 1 is operating in a low speed region to increase the turbine efficiency. The variable nozzle of the supercharger 4 can be opened when the engine 1 is operating in a high speed region to increase the turbine capacity. Thus, this arrangement enables a high supercharging effect to be obtained over a wide range of operating conditions.

An intake air throttle valve 8 is installed inside the air intake passage 5 at a location downstream of the compressor 4*a*. The intake air throttle valve 8 serves as an intake air regulating device to make it possible to control the quantity of intake air drawn into the engine 1. The intake air throttle valve 8 is, for example, an electronically controlled throttle valve whose opening degree can be varied freely using a stepper motor.

The exhaust passage 6 is provided with an exhaust gas recirculation (EGR) passage 9 that branches from a position between the engine 1 and the turbine 4*b*. The EGR passage 9 connects to the air intake passage 5 downstream of the intake air throttle valve 8.

The exhaust system is provided with an exhaust gas recirculation (EGR) control valve 10 that is installed in the EGR passage 9. The EGR valve 10 serves to control the exhaust gas recirculation quantity in accordance with the engine operating conditions. The EGR valve 10 is electronically controlled using a stepper motor such that the opening degree of the EGR valve 10 regulates the flow rate of the exhaust gas recirculated to the air intake system, i.e., the EGR quantity drawn into the engine 1. The EGR valve 10 is feedback (closed-loop) controlled to regulate the EGR quantity in such a manner as to achieve an EGR ratio set in accordance with the operating conditions.

The exhaust system is also provided with an oxidation catalytic converter 11 having an HC adsorbing function, a NOx trapping catalytic converter 12 having a NOx trapping function, and an exhaust gas fine particle capturing filter (DPF=diesel particulate filter) 13 arranged in sequence in the exhaust passage 6 at a position downstream of the turbine 4*b* of the turbocharger 4.

The oxidation catalytic converter 11 has the characteristic of adsorbing exhaust HCs when the temperature is low and releasing the HCs when the temperature is high and it functions to oxidize HCs and CO when in an active state. The NOx trapping catalytic converter 12 adsorbs or traps NOx contained in the exhaust gas when the excess air ratio λ is greater than 1, i.e., when the air fuel mixture is lean, and releases the NOx when the excess air ratio λ is rich. The NOx trapping catalytic converter 12 also functions to deoxidize the NOx when in an active state. The particulate filter 13 captures fine particles (PM=particulate matter) contained in the exhaust gas and the captured PM is combusted by raising the exhaust gas temperature using regeneration control.

A control unit 20 is provided to control the exhaust gas cleaning apparatus of the present invention. In particular, the control unit 20 determines and sets the intake air quantity Qa, the fuel injection quantity Qf and the injection timing IT based on detection signals from various sensors (described below) that serve to detect the operating state of the engine 1 and executes the controls based on these signals as explained below. Thus, the control unit 20 also controls the drive of the fuel injection valets 3, controls the opening degree of the intake throttle valve 8 and the EGR valve 10 in response to detection signals from various sensors (described below).

The control unit 20 is a microcomputer comprising of a central processing unit (CPU) and other peripheral devices. The control unit 20 can also include other conventional components such as an input interface circuit, an output interface circuit, and storage devices such as a ROM (Read Only Memory) device and a RAM (Random Access Memory) device. The control unit 20 preferably includes an engine control program that controls various components as discussed below. The control unit 20 receives input signals from various sensors (described below) that serve to detect the operating state of the engine 1 and executes the aforementioned controls based on these signals. It will be apparent to those skilled in the art from this disclosure that the precise structure and algorithms for the control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The intake air quantity Qa is detected by the air flow meter 7, which outputs a signal to the control unit 20 that is indicative of the intake air quantity Qa. The control unit 20 is also operatively coupled to a rotational speed sensor 14, an accelerator position sensor 15, an engine coolant temperature sensor 16, a rail pressure sensor 17, a plurality of exhaust system temperature sensors 21, 22 and 23, and an exhaust gas sensor or oxygen sensor 24. The rotational speed sensor 14 is configured and arranged to detect the engine rotational speed Ne of the engine 1, and output a signal to the control unit 20 that is indicative of the engine rotational speed Ne of the engine 1. The accelerator position sensor 15 is configured and arranged to detect the accelerator position APO, and output a signal to the control unit 20 that is indicative of the accelerator position APO.

The coolant temperature sensor 16 is configured and arranged to detect the temperature of the engine coolant Tw, and output a signal to the control unit 20 that is indicative of the temperature of the engine coolant Tw. The rail pressure sensor 17 is configured and arranged to detect the fuel pressure (fuel injection pressure) inside the common rail 2, and output a signal to the control unit 20 that is indicative of the fuel pressure (fuel injection pressure) inside the common rail 2. The temperature sensors 21, 22 and 23 are configured and arranged to detect the exhaust gas temperature in the general vicinity of the outlets of the oxidation catalytic converter 11, the NOx trapping catalytic converter 12, and the particulate filter 13, respectively. The temperature sensors 21, 22 and 23 are configured and arranged to output signals to the control unit 20 that are indicative of the exhaust gas temperature in the general vicinity of the outlets of the oxidation catalytic converter 11, the NOx trapping catalytic converter 12, and the particulate filter 13, respectively. The exhaust gas sensor 24 is configured and arranged in the exhaust passage 6 at a position upstream of the turbine 4*b* to detect the air fuel ratio or the oxygen concentration of the exhaust gas. The exhaust gas sensor 24 is configured and arranged to output a signal to the control unit 20 that is indicative of the air fuel ratio or the oxygen concentration of the exhaust gas.

Accordingly, the control unit 20 controls the regeneration of the NOx trapping catalytic converter 12 and the particulate filter 13. In other words, the control unit 20 controls the fuel injection quantity Qf delivered by the fuel injection valets 3 and the injection timing IT of the fuel injection valets 3 in accordance with various engine operating conditions. The control unit 20 further controls the opening degree of the intake air throttle valve 8 and the EGR valve 10 in accordance with various engine operating conditions. The control unit 20 further controls the regeneration of the NOx trapping catalytic converter 12 by determining when the total NOx absorbed to the NOx trapping catalytic converter 12 has reacted a prescribed value and, when the prescribed value is reached, executing regeneration control to shift the excess air ratio λ to a rich value and thereby desorb and deoxidize the NOx. The control unit 20 further controls the regeneration of the particulate filter 13 by executing regeneration control to raise the exhaust gas temperature and thereby combust/remove the particulate matter when the amount of particulate matter captured in the particulate filter 13 has reached a prescribed amount.

In relation to the present invention, the control unit 20 carries out the functions of a regeneration timing determining section, a regeneration control section, a feedback control section, and a feedback control restricting section. The regeneration timing determining section of the control unit 20 is configured to determine a regeneration operation timing to regenerate the exhaust gas cleaning device. The regeneration control section is configured to adjust the excess air ratio toward a rich target value to regenerate the exhaust gas cleaning device. The feedback control section is configured to feedback-control the fuel delivery quantity such that the excess air ratio is substantially maintained at the rich target value during regeneration. The feedback control restricting section is configured to restrict the feedback control during regeneration until a difference between the rich target value and an actual excess air ratio is less than a prescribed value.

Figure 3:
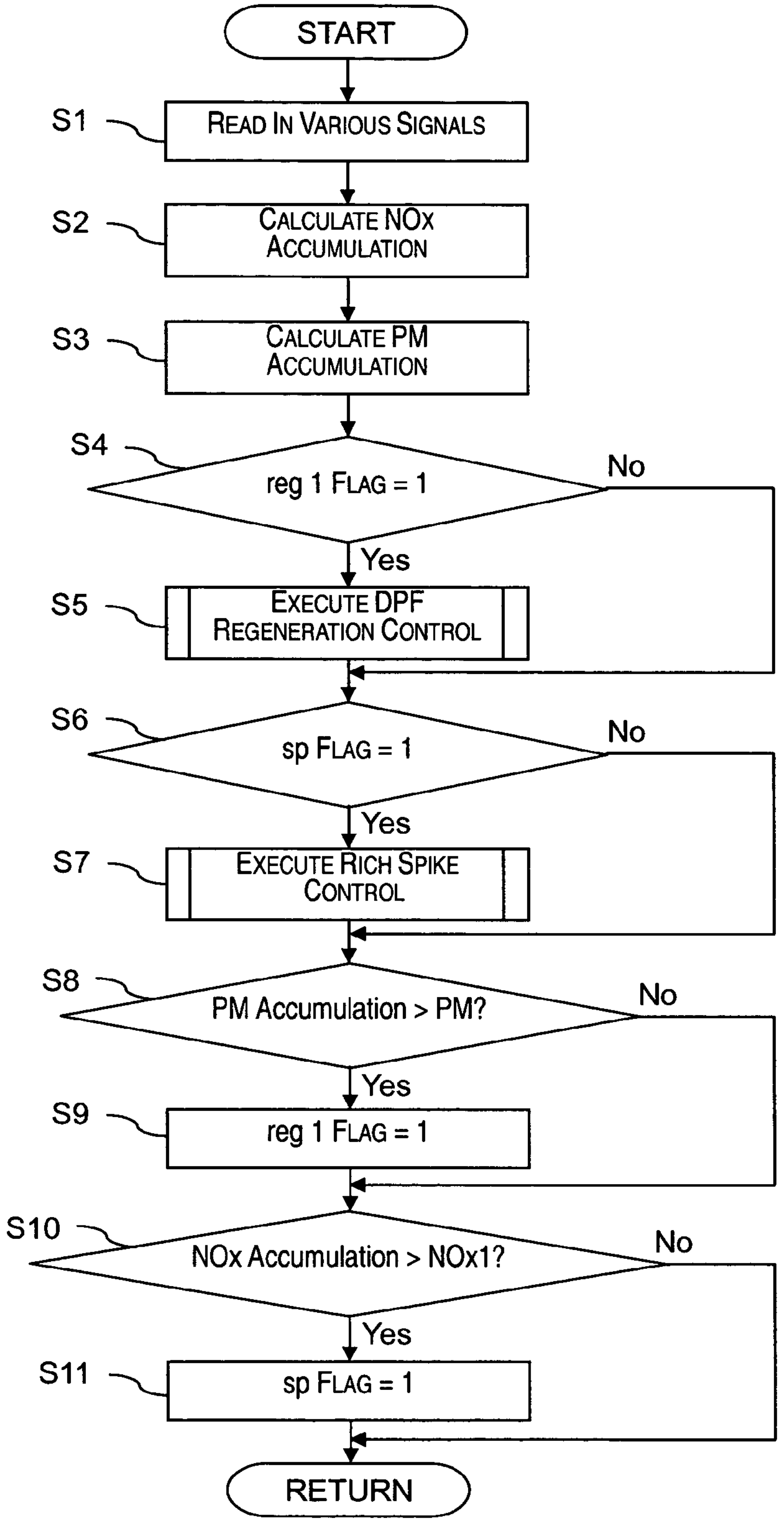
FIG. 3 is a flowchart showing the control operations executed by the control unit of the exhaust gas cleaning apparatus or system in accordance with the present invention.
Figure 4:
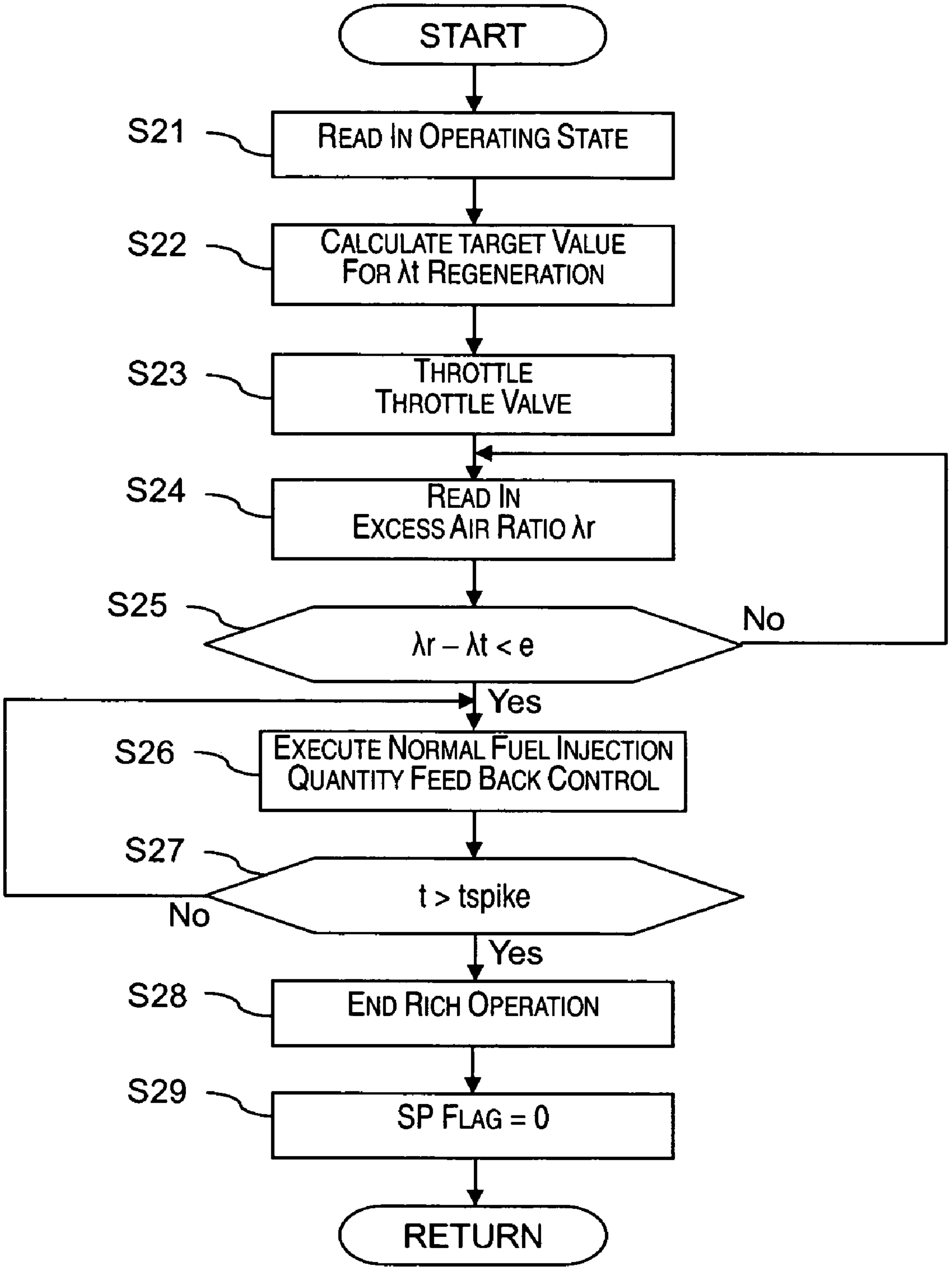
FIG. 4 is a flowchart showing the control operations executed by the control unit of the exhaust gas cleaning apparatus or system in accordance with the present invention in order to regenerate the NOx trapping catalytic converter.

These control routines of FIGS. 3 and 4 are periodically executed in a cyclic manner at a prescribed fixed time interval when the engine 1 is operating in accordance with certain predetermined engine operating conditions. First, the exhaust gas cleaning control executed by the control unit 20 will now be described with reference to FIG. 3.

In step S1, the control unit 20 reads in various signals from each of the sensors shown in FIG. 1 that represent engine operating conditions including, but not limited to, the engine rotational speed Ne, the accelerator position APO, the fuel injection quantity, and the engine coolant temperature. In other words, the engine operating state, e.g., load condition and rotational speed condition, of the engine 1 is determined by the control unit 20 receiving signals from each of the sensors shown in FIG. 1.

In step S2, the control unit 20 calculates the amount of NOx trapped and accumulated (adsorbed) in the NOx trapping catalytic converter 12. There are various known methods of calculating the NOx accumulation amount using theses signals from the sensors of FIG. 1. For example, the NOx accumulation amount can be estimated based on the distance the vehicle has traveled and/or a value obtained by integrating the engine rotational speed Ne. When the value of an integral is used, the integral value is reset at the point in time when regeneration control of NOx trapping catalytic converter 12 is completed.

In step S3, the control unit 20 calculates the amount of particulate matter (PM) captured and accumulated in the DPF 13. One method of calculating the PM accumulation amount is to utilize the fact that the exhaust gas pressure in the vicinity of the inlet of the DPF 13 increases when the amount of PM accumulated in the DPF increases, and then estimate the PM accumulation amount by comparing the detected exhaust gas pressure in the vicinity of the inlet with a reference exhaust gas pressure for the current engine operating conditions (e.g., engine rotational speed and fuel injection quantity). The PM accumulation amount can also be estimated based on a combination of an integral of the engine rotational speed since the last regeneration of the DPF, the traveling distance since the last regeneration of the DPF, and the exhaust gas pressure.

In step S4, the control unit 20 determines if the reg1 flag is on, indicating that the apparatus is in the DPF regeneration mode. If the value of the reg1 flag is 1, then the control unit 20 proceeds to step S5 and executes regeneration control of the DPF 13. If the reg1 flag is not set to 1, then the control unit 20 proceeds to step S6.

During regeneration control of the DPF 13, the exhaust temperature is raised by using such techniques as executing a post-injection of fuel in which the PM captured in the DPF 13 is combusted. When regeneration control of the DPF 13 is finished, the value of the reg1 flag is set to 0.

In step S6, the control unit 20 determines if the sp flag is on, indicating that the NOx trapping catalytic converter 12 is in a regeneration mode, i.e., rich spike mode (shifting of the excess air ratio λ to a rich value) for the purpose of desorbing and cleaning the NOx adsorbed by the NOx trapping catalytic converter 12. If the value of the sp flag is 1, then the control unit 20 proceeds to step S7 where it executes rich spike control (NOx trapping catalytic converter regeneration control). If the sp flag is not set to 1, then the control unit 20 proceeds to step S8.

The NOx trapping catalytic converter regeneration control will be described later with reference to FIG. 4.

In step S8, the control unit 20 determines if the PM accumulation amount of the DPF 13 calculated in step S3 has reached the prescribed amount PM 1, indicating that it is time to regenerate the DPF 13. If the PM accumulation amount is larger than PM 1, then the control unit 20 determines that it is time to regenerate the DPF 13 and turns on the reg1 flag (i.e., sets the value of the reg1 flag to 1) in step S9 to indicate that regeneration is in progress. If the PM accumulation amount is smaller than PM1, then the control unit 20 proceeds to step S10.

In step S10, the control unit 20 determines if the amount of the NOx accumulated in the NOx trapping catalytic converter 12 has reached the prescribed amount NOx1, indicating that it is time to regenerate the NOx trapping catalytic converter 12. If the NOx accumulation amount is larger than the NOx1, then the control unit 20 determines that it is time to regenerate the NOx trapping catalytic converter 12 and turns on the sp flag (i.e., sets the value of the sp flag to 1) in step S11 to indicate that regeneration of the NOx trap flag is in progress.

The control executed during NOx trapping catalytic converter regeneration mode will now be described with reference to FIG. 4.

The flow of steps shown in FIG. 4 are executed when the NOx accumulation amount reaches the prescribed value NOx1 and the sp flag is set to 1 during the processing shown in FIG. 3.

In step S21, the control unit 20 reads in signals indicating current operating state of the engine including, but not limited to such factors as the engine rotational speed, the fuel injection quantity, and the engine coolant temperature. In step S22, the control unit 20 calculates a target value Ct of the excess air ratio λ for the purpose of regenerating the NOx trapping catalytic converter based on the input signals. The target value λt of the excess air ratio λ is set to, for example, 0.8 during regeneration.

In step S23, the control unit 20 reduces the opening degree of the intake air throttle valve 8 to a prescribed opening degree in order to shift the excess air ratio λ to the rich target value. The excess air fuel ratio λ is the ratio of supplied air mass to air requirement for stoichiometric combustion. Thus, the excess air fuel ratio λ has a value of 1 when the air-fuel mixture is at a stoichiometric air fuel ratio, a value greater than 1 when the air-fuel mixture is lean, and a value less than 1 when the air-fuel mixture is rich.

In step S24, the control unit 20 reads in a detected or estimated value of the actual excess air ratio λr. The actual excess air ratio λr can be detected based on the oxygen concentration detected by the exhaust gas sensor 24 or estimated by calculating based on the intake air quantity and the fuel injection quantity of the engine 1.

In step S25, the control unit 20 compares the actual excess air ratio λr to the target value λt and waits until the difference λr−λt is less than a prescribed value e. The prescribed value e is determined on an experimental basis, since many design parameters of the engine will affect the prescribed value e. In any event, the prescribed value e should be determined to minimize severe fluctuations in output that may cause torque shock to occur.

After the opening degree of the intake air throttle valve 8 is reduced, the air quantity does not decrease immediately and a delay time elapses before the actual excess air ratio λr reaches the target value λt. When the control unit 20 determines that the difference λr−λt is less than a prescribed value e, it proceeds to step S26 and begins feedback control of the fuel injection quantity.

The excess air ratio λ is held at the rich target value λt during regeneration and, so long as the operating state of the engine 1 does not undergo transient changes, the fuel injection quantity basically does not change from the fuel injection quantity that was in effect immediately before the apparatus shifted to regeneration control. In other words, the fuel injection quantity remains at the quantity computed based on the engine operating state using the accelerator position, the engine rotational speed, etc.

In order to efficiently regenerate the NOx trapping catalytic converter 12, it is necessary to control the excess air ratio λ of the exhaust gas to the target value λt accurately, but it is difficult to control the excess air ratio λ to the target value λt with good precision and quick response by merely controlling the opening degree of the intake air throttle valve 8.

Therefore, this embodiment is configured such that when the difference between the actual excess air ratio λr and the target value λt becomes less than the prescribed value e, the excess air ratio λ is adjusted to the target value λt by revising the fuel injection quantity. By not starting feedback control until the difference reaches the prescribed value e, the resulting torque shock is prevented from being particularly large in the event that the requested fuel injection quantity should increase.

The feedback control of the fuel injection quantity is executed while detecting or estimating the actual excess air ratio λr.

In step S27, the control unit 20 determines if the time t elapsed since regeneration control started has reached a prescribed amount of time tspike. If time t is not larger than time tspike, then the control unit 20 waits until the time tspike has elapsed.

The prescribed time tspike is an amount of time corresponding to the amount of time required for regeneration of the NOx trapping catalytic converter to be completed.

If the time t is larger than time tspike, then the control unit 20 ends rich operation in step S28. More specifically, the control unit 20 returns the opening degree of the intake air throttle valve 8 to its original state and executes open control of the fuel injection quantity based on the engine rotational speed and accelerator position so as to accomplish a prescribed lean operating state.

In step S29, the sp flag is set to 0 and the processing loop ends.

The overall function of the apparatus will now be described centering on the regeneration of the NOx trapping catalytic converter 12.

The fuel injection quantity and the fuel injection timing with which fuel is delivered to the engine 1 are adjusted to optimum values based on the operating state of the engine 1 and the intake air throttle valve 8 is maintained at a large opening degree so that the excess air ratio λ is at a lean value during normal operation.

During lean operation, the NOx (which is one emission component contained in the exhaust gas) is adsorbed to the NOx trapping catalytic converter 12 and prevented from being released to the outside. When the excess air ratio λ is lean, the NOx trapping catalytic converter 12 cannot deoxidize the NOx and the NOx is held adsorbed to the NOx trapping catalytic converter 12.

When the control unit 20 determines that the amount of NOx that is adsorbed and held, i.e., accumulated, has reached a prescribed state, it executes control to regenerate the NOx trapping catalytic converter 12. The regeneration control functions to change the excess air ratio λ to a rich value for a prescribed short period of time. Thus, the regeneration control involves reducing the opening degree of the intake air throttle valve 8 by a prescribed amount to reduce the intake air quantity and achieve a targeted excess air ratio λt (e.g., an excess air ratio λ of 0.8). In principle, the fuel injection quantity is not changed from the fuel injection quantity that was in effect before the regeneration control has started, thereby preventing the fluctuations in the torque produced by the engine 1.

However, since it is difficult to control the excess air ratio λ to the target value λt accurately by merely controlling the opening degree of the intake air throttle valve 8, the fuel injection quantity is feedback-controlled during the regeneration control so that the excess air ratio λ is matched correctly to the target value λt. As a result, the regeneration of the NOx trapping catalytic converter 12, i.e., the desorption and deoxidizing of the NOx, can be accomplished efficiently.

When the opening degree of the intake air throttle valve 8 is reduced by a prescribed amount after the apparatus shifts to the regeneration operation, the excess air ratio λ does not change immediately from a lean value to a rich value. Instead, a delay time elapses before the actual excess air ratio λr reaches the target value λt. If the actual excess air ratio λr is far leaner than the target value λt when the feedback control of the fuel injection quantity is started, the fuel injection quantity will be increased greatly in accordance with the difference between the excess air ratios and the occurrence of torque shock will be unavoidable.

However, in this embodiment, feedback control is prohibited after the regeneration operation is started until the difference between the actual excess air ratio λr and the target excess air ratio λt is less than a prescribed value. As a result, the fuel injection quantity is not increased suddenly in an attempt to change from a lean state to a rich state and the occurrence of torque shock can be prevented.

When it determines that regeneration control has ended, the control unit 20 returns the intake air throttle valve 8 to its original opening degree, stops feedback control of the fuel injection quantity, and controls the fuel injection quantity in accordance with the operating state of the engine while maintaining the excess air ratio λ at a prescribed lean state.

When the engine load is high, the fuel injection quantity becomes large and the excess air ratio λ shifts to a rich value even if the intake air throttle valve 8 is held fully open. When this situation occurs, the NOx trapping catalytic converter 12 undergoes regeneration automatically irregardless of the amount of accumulated NOx. However, since feedback control of the fuel injection quantity is not executed, the previously discussed problems are not an issue.

Thus, as described heretofore, during regeneration of a NOx trapping catalytic converter 12 serving as an exhaust gas cleaning device in an exhaust gas cleaning apparatus accordance with this embodiment, the fuel injection quantity is feedback-controlled to maintain the excess air ratio λ at a rich target value λt. Meanwhile, the feedback control is restricted (e.g., prohibited) so that it does not start until the difference between the actual excess air ratio λr and the target value is less than a prescribed value. As a result, the excess air ratio λ can be controlled accurately to the value necessary for regeneration of the NOx trapping catalytic converter 12 and the regeneration control can be executed with good efficiency and high precision. Furthermore, the occurrence of torque shock caused by a sudden increase in fuel delivery quantity when the apparatus shifts to the regeneration operation can be reliably avoided.

When the excess air ratio λ is lowered to the target excess air ratio value λt, first the opening degree of the intake air throttle valve 8 is reduced and afterwards the fuel injection quantity is feedback-controlled when the excess air ratio λ is within a prescribed range with respect to the target value. Consequently, the output characteristic of the engine is substantially unchanged before and after regeneration control begins and the apparatus can be shifted to regeneration control without causing the driver to experience a feeling that something is abnormal.

The actual excess air ratio λr can be calculated using the output of an exhaust gas sensor 24 installed in the exhaust system, thus enabling the excess air ratio λ to be detected accurately.

By estimating the actual excess air ratio λr based on the intake air quantity and the fuel delivery quantity, the control can be accomplished using existing sensors.

Second Embodiment

Figure 5:
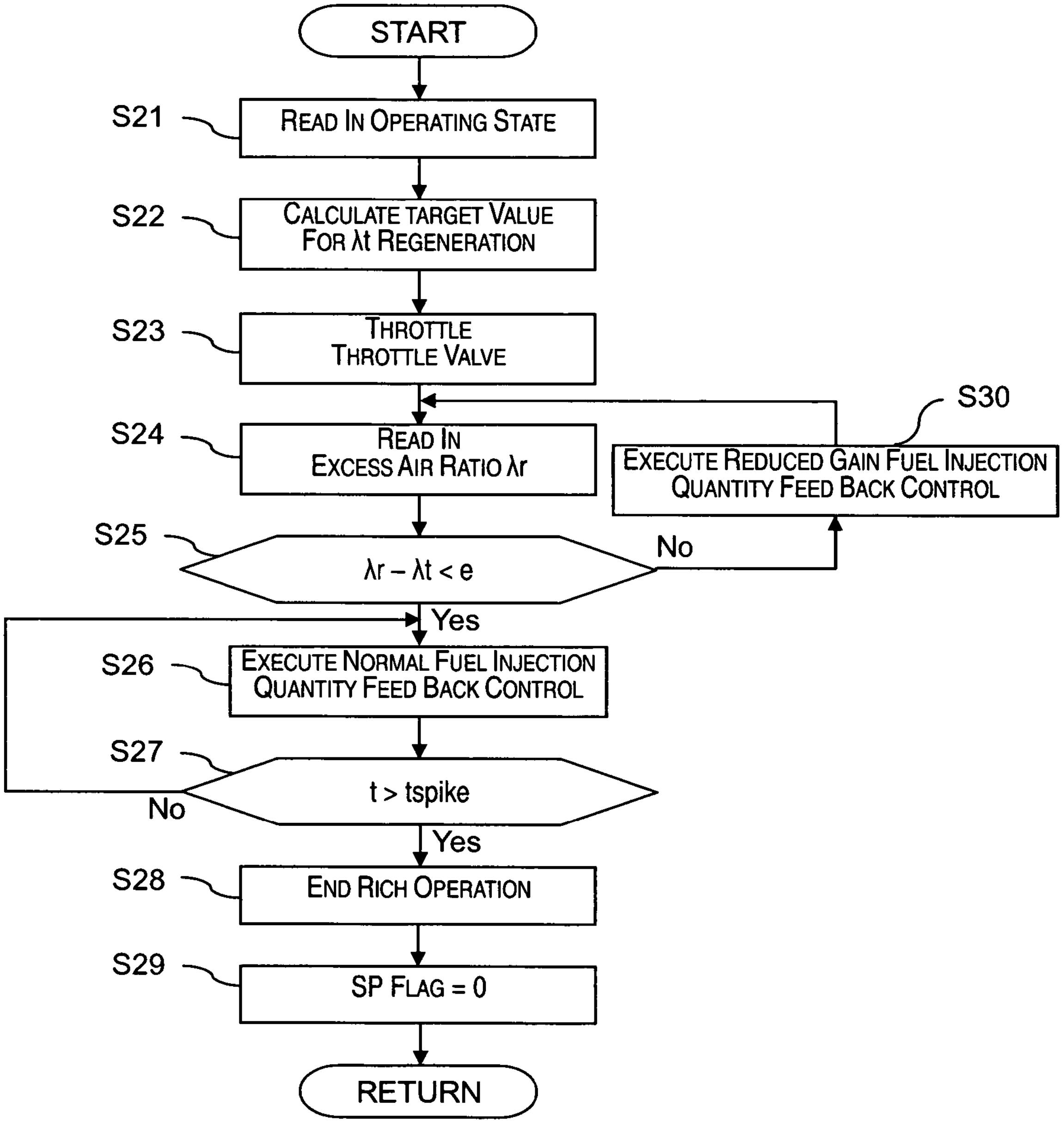
FIG. 5 is a first alternate flowchart showing alternate control operations that are executed by the control unit of the exhaust gas cleaning apparatus or system in accordance with another embodiment of the present invention in order to regenerate the NOx trapping catalytic converter.

Referring now to FIG. 5, an alternate flow chart in accordance with a second embodiment will now be explained. This alternate flow chart illustrates the control operations by the control unit 20 in which the feedback control is not prohibited, but rather where a reduced gain is used to restrict feedback control. In view of the similarity between the first and second embodiments, the steps of the second embodiment that are identical to the steps of the first embodiment will be given the same reference numerals as the steps of the first embodiment. Moreover, the descriptions of the steps performed by the control unit 20 in the second embodiment that are identical to the steps of the first embodiment will be omitted for the sake of brevity.

Basically, the control operations illustrated by the alternate flow chart of FIG. 5 are the same as those in the flow chart of FIG. 4, discussed above, except for step S30 has been added. In other words, in the previously described embodiment, when the apparatus shifts to regeneration control of the NOx trapping catalytic converter 12, the feedback control of the fuel injection quantity is not started until the actual excess air ratio λr is within a prescribed range with respect to the target value λt. In this second embodiment, the feedback control uses an alternative restriction method of restricting the feedback control in which the restriction of the feedback control is accomplished by setting the feedback control gain to a reduced gain having a slower response time than the normal feedback control gain and thereby suppressing rapid increases in the fuel injection quantity. In other words, feedback control is started simultaneously with constricting the intake air throttle valve 8 but at a gain that produces a slower response time. Then, when the actual excess air ratio λr enters the prescribed range e with respect to the target value λt, the feedback control is executed at the normal gain.

Third and Fourth Embodiments

Figure 6:
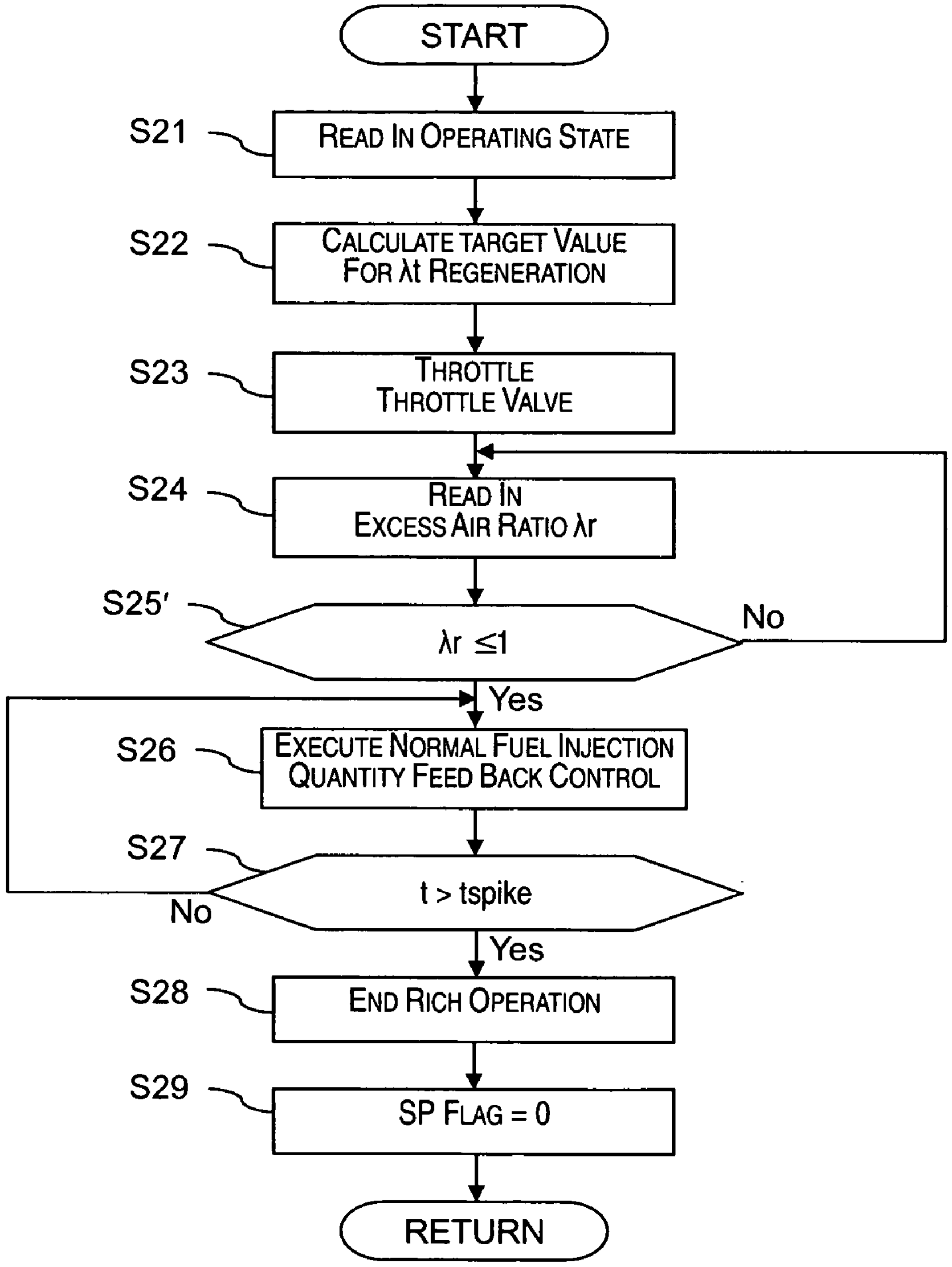
FIG. 6 is a second alternate flowchart showing the control operations executed by the control unit of the exhaust gas cleaning apparatus or system in accordance with another embodiment of the present invention in order to regenerate the NOx trapping catalytic converter.
Figure 7:
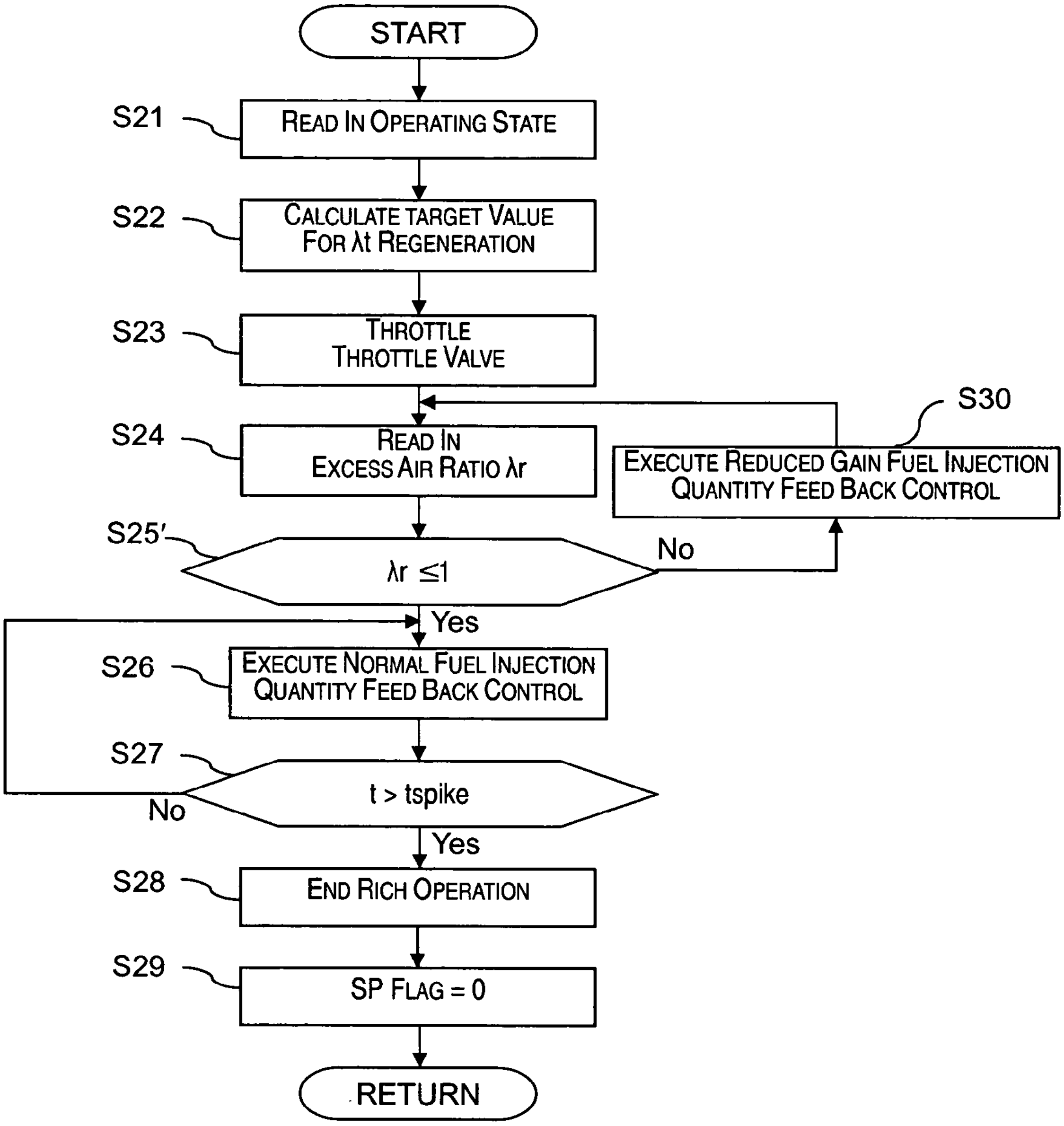
FIG. 7 is a third alternate flowchart showing alternate control operations that are executed by the control unit of the exhaust gas cleaning apparatus or system in accordance with another embodiment of the present invention in order to regenerate the NOx trapping catalytic converter.

Referring now to FIGS. 6 and 7, two alternate flow charts in accordance with third and fourth embodiments will now be explained. These alternate flow charts illustrate the control operations by the control unit 20 in which step S25 has been replaced with step S25'. Otherwise, the control operations illustrated in the alternate flow charts of FIGS. 6 and 7 are the same as those in the flow charts of FIGS. 4 and 5, respectively. In view of the similarity between these embodiments and the first and second embodiments, the steps of these embodiments that are identical to the steps of the first and second embodiments will be given the same reference numerals as the steps of the first and second embodiments. Moreover, the descriptions of the steps performed by the control unit 20 in these embodiments that are identical to the steps of the first and second embodiments will be omitted for the sake of brevity.

The alternate flow charts of FIGS. 6 and 7 illustrate the control operations by the control unit 20 in which the end of the restriction of feedback control is based on the actual excess air ratio λr reaching the stoichiometric value from the lean side, instead of using the prescribed value. Thus, once the excess air ratio λ moves to the rich side of the stoichiometric excess air ratio, the torque produced by the engine 1 does not change considerably even if the fuel injection quantity is increased such that the excess air ratio λ moves to a still richer value. Therefore, in step S25, it is also acceptable to configure the apparatus such that when it is determined that the actual excess air ratio λr has reached the stoichiometric value from the lean side. Thus, feedback control of the fuel injection ratio is started even if the difference between the actual excess air ratio λr and the target value λt has not reached the prescribed value. In such a case, the regeneration control starts earlier because the excess air ratio λ reaches the target value λt earlier.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-283285. The entire disclosure of Japanese Patent Application No. 2003-283285 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An exhaust gas cleaning apparatus for an engine comprising:

a fuel delivery device configured to deliver a fuel delivery quantity of fuel to the engine to produce an excess air ratio that is lean during normal operation of the engine;

an exhaust gas cleaning device arranged in an exhaust system and configured to clean exhaust gas during a lean operation; and a control unit configured to control the fuel delivery device, the control unit including a regeneration timing determining section configured to determine a regeneration operation timing to regenerate the exhaust gas cleaning device;

a regeneration control section configured to adjust the excess air ratio toward a rich target value to regenerate the exhaust gas cleaning device by controlling an intake air throttle valve in an intake passage of the engine;

a feedback control section configured to feedback-control the fuel delivery quantity such that the excess air ratio is substantially maintained at the rich target value during regeneration; and a feedback control restricting section configured to restrict the feedback control during regeneration until a difference between the rich target value and an actual excess air ratio is less than a prescribed value, the regeneration control section being further configured to reduce an opening degree of the intake air throttle valve to a prescribed opening degree before the difference between the rich target value and the actual excess air ratio is less than the prescribed value, and maintain the fuel delivery quantity during regeneration before the difference between the rich target value and the actual excess air ratio is less than the prescribed value to a fuel delivery quantity being delivered before the regeneration starts.

2. The exhaust gas cleaning apparatus as recited in claim 1, wherein the feedback control restricting section is configured to prohibit the feedback control in order restrict the feedback control during regeneration.

3. The exhaust gas cleaning apparatus as recited in claim 1, wherein the feedback control restricting section is configured to lower the feedback control gain below a normal feedback control gain in order restrict the feedback control during regeneration.

4. An exhaust gas cleaning apparatus for an engine comprising:

a fuel delivery device configured to deliver a fuel delivery quantity of fuel to the engine to produce an excess air ratio that is lean during normal operation of the engine;

an exhaust gas cleaning device arranged in an exhaust system and configured to clean exhaust gas during a lean operation; and a control unit configured to control the fuel delivery device, the control unit including a regeneration timing determining section configured to determine a regeneration operation timing to regenerate the exhaust gas cleaning device;

a regeneration control section configured to adjust the excess air ratio toward a rich target value to regenerate the exhaust gas cleaning device;

a feedback control section configured to feedback-control the fuel delivery quantity such that the excess air ratio is substantially maintained at the rich target value during regeneration; and a feedback control restricting section configured to restrict the feedback control during regeneration until a difference between the rich target value and an actual excess air ratio is less than a prescribed value, the feedback control restricting section being configured to end restriction of the feedback control when the actual excess air ratio is determined to reach a stoichiometric air fuel ratio.

5. The exhaust gas cleaning apparatus as recited in claim 1, wherein the exhaust gas cleaning device includes a NOx trapping catalytic converter configured to adsorb NOx when the excess air ratio is lean, and to desorb and deoxidize the adsorbed NOx when the excess air ratio is richer than a stoichiometric excess air ratio.

6. The exhaust gas cleaning apparatus as recited in claim 1, wherein the regeneration timing determining section is configured to execute regeneration when the regeneration timing determining section determines that a total quantity of NOx adsorbed by the NOx trapping catalytic converter has reached a prescribed value.

7. The exhaust gas cleaning apparatus as recited in claim 1, wherein the feedback control restricting section is configured to calculate the actual excess air ratio based on an output of an exhaust sensor disposed in the exhaust system upstream of the exhaust gas cleaning device.

8. The exhaust gas cleaning apparatus as recited in claim 1, wherein the feedback control restricting section is configured to estimate the actual excess air ratio based on an intake air quantity and the fuel delivery quantity.

9. The exhaust gas cleaning apparatus as recited in claim 1, wherein the fuel delivery device includes a direct fuel injection valve configured to inject fuel directly into an engine combustion chamber.

10. The exhaust gas cleaning apparatus as recited in claim 5, wherein the exhaust gas cleaning device includes an oxidation catalytic converter having an HC adsorbing function arranged at a position upstream of the NOx trapping catalytic convener in the exhaust system and an exhaust gas fine particle capturing filter arranged downstream of the of the NOx trapping catalytic converter in the exhaust system.

11. The exhaust gas cleaning apparatus as recited in claim 10, wherein the feedback control restricting section is configured to prohibit the feedback control in order restrict the feedback control during regeneration.

12. The exhaust gas cleaning apparatus as recited in claim 10, wherein the feedback control restricting section is configured to lower the feedback control gain below a normal feedback control gain in order restrict the feedback control during regeneration.

13. An exhaust gas cleaning apparatus for an engine comprising:

a fuel delivery device configured to deliver a fuel delivery quantity of fuel engine to produce an excess air ratio that is lean during normal operation of the engine;

an exhaust gas cleaning device arranged in an exhaust system and configured to clean exhaust gas during a lean operation; and a control unit configured to control the fuel delivery device, the control unit including a regeneration timing determining section configured to determine a regeneration operation timing to regenerate the exhaust gas cleaning device;

a regeneration control section configured to adjust the excess air ratio toward a rich target value to regenerate the exhaust gas cleaning device;

a feedback control section configured to feedback-control the fuel delivery quantity such that the excess air ratio is substantially maintained at the rich target value during regeneration; and a feedback control restricting section configured to restrict the feedback control during regeneration until a difference between the rich target value and an actual excess air ratio is less than a prescribed value, the feedback control restricting section being is configured to prohibit the feedback control in order restrict the feedback control during regeneration and to end restriction of the feedback control when the actual excess air ratio is determined to reach a stoichiometric air fuel ratio.

14. The exhaust gas cleaning apparatus as recited in claim 13, wherein the regeneration timing determining section is configured to execute regeneration when the regeneration timing determining section determines that a total quantity of NOx adsorbed by the NOx trapping catalytic converter has reached a prescribed value.

15. An exhaust gas cleaning apparatus for an engine comprising:

a fuel delivery device configured to deliver a fuel delivery quantity of fuel to the engine to produce an excess air ratio that is lean during normal operation of the engine;

an exhaust gas cleaning device arranged in an exhaust system and configured to clean exhaust gas during a lean operation; and a control unit configured to control the fuel delivery device, the control unit including a regeneration timing determining section configured to determine a regeneration operation timing to regenerate the exhaust gas cleaning device;

a regeneration control section configured to adjust the excess air ratio toward a rich target value to regenerate the exhaust gas cleaning device;

a feedback control section configured to feedback-control the fuel delivery quantity such that the excess air ratio is substantially maintained at the rich target value during regeneration; and a feedback control restricting section configured to restrict the feedback control during regeneration until a difference between the rich target value and an actual excess air ratio is less than a prescribed value, the feedback control restricting section being configured to lower the feedback control gain below a normal feedback control gain in order restrict the feedback control during regeneration and to end restriction of the feedback control when the actual excess air ratio is determined to reach a stoichiometric air fuel ratio.

16. The exhaust gas cleaning apparatus as recited in claim 15, wherein the regeneration timing determining section is configured to execute regeneration when the regeneration timing determining section determines that a total quantity of NOx adsorbed by the NOx trapping catalytic converter has reached a prescribed value.

17. An exhaust gas cleaning apparatus for an engine comprising:

fuel delivery means for delivering a fuel delivery quantity of fuel to the engine to produce an excess air ratio that is lean during normal operation of the engine;

exhaust gas cleaning means for cleaning exhaust emission particles contained in exhaust gas during a lean operation of the engine;

regeneration timing determining means for determining a regeneration operation timing to regenerate the exhaust gas cleaning means;

a regeneration control means for adjusting the excess air ratio toward a rich target value to regenerate the exhaust gas cleaning means by controlling an intake air throttle valve in an intake passage of the engine;

feedback control means for feedback-controlling the fuel delivery quantity such that the excess air ratio is maintained at the rich target value during regeneration; and feedback control restricting means for restricting the feedback regeneration until a difference between the rich target value and an actual excess air ratio is less than a prescribed value;

the regeneration control means further performing functions of reducing an opening degree of the intake air throttle valve to a prescribed opening degree before the difference between the rich target value and the actual excess air ratio is less than the prescribed value, and maintaining the fuel delivery quantity during regeneration before the difference between the rich target value and the actual excess air ratio is less than the prescribed value to a fuel delivery quantity being delivered before the regeneration starts.

18. A method of cleaning exhaust gas of an engine comprising:

delivering a fuel delivery quantity of fuel and an intake air quantity to the engine to produce an excess air ratio that is lean during normal operation of the engine;

cleaning exhaust emission particles contained in exhaust gas with cleaning device during a lean operation of the engine;

determining a regeneration operation timing to regenerate the exhaust gas cleaning device;

adjusting the excess air ratio toward a rich target value to regenerate the exhaust gas cleaning device by reducing an opening degree of an intake air throttle valve in an intake passage of the engine to a prescribed opening degree before a difference between the rich target value and an actual excess air ratio is less than a prescribed value, and maintaining the fuel delivery quantity during regeneration before the difference between the rich target value and the actual excess air ratio is less than the prescribed value to a fuel delivery quantity being delivered before the regeneration starts;

feedback controlling the fuel delivery quantity such that the excess air ratio is maintained at the rich target value during regeneration; and selectively restricting the feedback-controlling of the fuel delivery quantity during regeneration until the difference between the rich target value and the actual excess air ratio is less than the prescribed value.

* * * * *